(12) United States Patent
Evans et al.

(10) Patent No.: US 12,529,333 B2
(45) Date of Patent: Jan. 20, 2026

(54) PARTIAL EXHAUST CONDENSATION WITH CRYOGENIC ASSISTED BOTTOMING CYCLE

(71) Applicant: RTX CORPORATION, Farmington, CT (US)

(72) Inventors: Brandon M. Evans, San Antonio, TX (US); Neil J. Terwilliger, Cheshire, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/770,979

(22) Filed: Jul. 12, 2024

(65) Prior Publication Data

US 2024/0360787 A1    Oct. 31, 2024

Related U.S. Application Data

(63) Continuation-in-part of application No. 17/871,270, filed on Jul. 22, 2022.

(51) Int. Cl.
*F02C 3/30* (2006.01)
*F01K 23/10* (2006.01)
(Continued)

(52) U.S. Cl.
CPC ............ *F02C 3/30* (2013.01); *F01K 23/10* (2013.01); *F02C 1/10* (2013.01); *F02C 3/22* (2013.01);
(Continued)

(58) Field of Classification Search
CPC .......... F01K 23/10; F01K 23/08; F02C 7/224; F02C 7/141; F02C 7/32; F02C 6/18;
(Continued)

(56) References Cited

U.S. PATENT DOCUMENTS 3,517,505 A * 6/1970 Silverman .................. F02C 3/30
239/265.17
7,971,438 B2 * 7/2011 Taylor ...................... F02C 7/143
60/39.511
(Continued)

FOREIGN PATENT DOCUMENTS

EP    3048281 A1    4/2017
EP    4147979 A1    3/2023
(Continued)

OTHER PUBLICATIONS

Extended European Search Report for European Application No. 25189419.2 mailed Dec. 8, 2025.

*Primary Examiner* — Devon C Kramer
*Assistant Examiner* — Henry Ng
(74) *Attorney, Agent, or Firm* — Carlson, Gaskey & Olds, P.C.

(57) ABSTRACT

An aircraft propulsion system includes a core engine and a bottoming cycle where a working fluid is circulated within a closed circuit. A first heat exchanger is used to transfer heat from a portion of thermal energy from the exhaust gas flow to working fluid of the bottoming cycle. A fuel/working fluid heat exchanger provides the cryogenic fuel to cool the working fluid exhausted from a bottoming turbine and before a bottoming compressor.

20 Claims, 2 Drawing Sheets

(51) Int. Cl.
　　　*F02C 1/10*　　(2006.01)
　　　*F02C 3/22*　　(2006.01)
　　　*F02C 6/18*　　(2006.01)
　　　*F02C 7/141*　(2006.01)

(52) U.S. Cl.
　　　CPC ............... *F02C 6/18* (2013.01); *F02C 7/141* (2013.01); *F05D 2260/213* (2013.01)

(58) Field of Classification Search
　　　CPC ........ F02C 1/007; F02C 1/10; F05D 2260/10; F05D 2260/213; F05D 2260/232; B64D 2033/045; F02K 1/822
　　　See application file for complete search history.

(56) References Cited

U.S. PATENT DOCUMENTS

| | | | |
|---|---|---|---|
| 9,896,218 B2* | 2/2018 | Swann | F02C 9/00 |
| 10,371,003 B2* | 8/2019 | Swann | F01D 21/003 |
| 11,753,993 B1 | 9/2023 | Terwilliger et al. | |
| 11,815,030 B1* | 11/2023 | Owoeye | F02K 1/822 |
| 12,352,207 B1* | 7/2025 | Rambo | F02C 3/30 |
| 2015/0096300 A1* | 4/2015 | Gurin | F01K 23/04 60/668 |
| 2018/0355765 A1* | 12/2018 | Patel | F02B 29/04 |
| 2021/0001269 A1* | 1/2021 | Klingels | F02K 1/46 |
| 2021/0207500 A1* | 7/2021 | Klingels | F02C 3/305 |
| 2023/0212983 A1* | 7/2023 | Sibilli | F02C 7/14 60/730 |
| 2023/0366348 A1* | 11/2023 | Alahyari | F02K 1/822 |
| 2024/0026824 A1 | 1/2024 | Terwilliger et al. | |
| 2024/0271548 A1* | 8/2024 | Terwilliger | F01K 15/02 |
| 2024/0271550 A1* | 8/2024 | Terwilliger | F02C 3/22 |
| 2025/0075641 A1* | 3/2025 | Terwilliger | F01K 23/10 |
| 2025/0075649 A1* | 3/2025 | Terwilliger | F01K 23/10 |
| 2025/0084793 A1* | 3/2025 | Sibbach | F02C 7/224 |

FOREIGN PATENT DOCUMENTS

| | | |
|---|---|---|
| EP | 4227509 A1 | 8/2023 |
| EP | 4310301 A1 | 1/2024 |
| EP | 4517067 A1 | 3/2025 |
| GB | 2608643 A | 1/2023 |

* cited by examiner

PARTIAL EXHAUST CONDENSATION WITH CRYOGENIC ASSISTED BOTTOMING CYCLE

CROSS REFERENCE TO RELATED APPLICATION

This application is a continuation-in-part of U.S. application Ser. No. 17/871,270 filed on Jul. 22, 2022. The disclosures of U.S. application Ser. No. 17/871,270 are incorporated by reference in its entirety in this application.

TECHNICAL FIELD

The present disclosure relates generally to a bottoming cycle for an aircraft propulsion system and more specifically to a bottoming cycle that utilizes a cryogenic fuel as a heat sink.

BACKGROUND OF THE INVENTION

Gas turbine engines typically include a compressor where inlet air is compressed and delivered into a combustor. In the combustor, the compressed air is mixed with fuel and ignited to generate an exhaust gas flow. The exhaust flow is expanded through a turbine section to generate shaft power used to drive the compressor and a propulsive fan. Some energy in the high energy exhaust flow is recovered as it is expanded through a turbine section. However, a large amount of energy in the form of heat is simply exhausted from the turbine section to the atmosphere. A bottoming cycle utilizes recovered heat to generate additional useful work. A working fluid in the bottoming cycle is heated to drive a secondary turbine to generate additional shaft power. The working fluid in the bottoming cycle is then cooled, compressed, and reheated before expansion back through the turbine. The capability of the working fluid to accept heat limits energy recovery of the bottoming cycle.

SUMMARY OF THE INVENTION

An aircraft propulsion system according to an exemplary embodiment of this disclosure includes, among other things, a core engine comprising a combustor where a cryogenic fuel is mixed with compressed air and ignited to generate an exhaust gas flow, wherein the exhaust gas flow is split into a first portion and a second portion, a propulsive fan driven by the core engine, a bottoming cycle where a working fluid is circulated within a closed circuit comprising a bottoming compressor section and a bottoming turbine section, wherein the working fluid is compressed in the bottoming compressor section and expanded through the bottoming turbine section to generate shaft power, a first heat exchanger where a portion of thermal energy from the exhaust gas flow is communicated to the working fluid of the bottoming cycle, a fuel system comprising a cryogenic fuel storage tank and a fuel flow path for routing a cryogenic fuel to the combustor, a fuel/working fluid heat exchanger where a portion of thermal energy from the working fluid is communicated to the cryogenic fuel to cool the working fluid exhausted from the bottoming turbine and before the bottoming compressor, a water recovery system comprising a condenser where the second portion of the exhaust gas flow is cooled to condense water, wherein the first portion of the exhaust gas flow is bypassed around the condenser, a steam generation system comprising an evaporator where water is heated to generate a steam flow, wherein a portion of the cryogenic fuel cools the exhaust gas flow within the condenser, and a variable exhaust nozzle assembly, wherein the variable exhaust nozzle is adjustable to separately control the first portion of the exhaust gas flow and the second portion of the exhaust gas flow communicated through the condenser.

A further embodiment of the foregoing aircraft propulsion system, further includes a controller programmed to operate the variable exhaust nozzle assembly to control a ratio between the first portion of the exhaust gas flow and the second portion of the exhaust gas flow through the condenser based on information indicative of a current capacity of the cryogenic fuel to cool the exhaust gas flow in the condenser.

In a further embodiment of any of the foregoing aircraft propulsion systems, the variable exhaust nozzle assembly includes a first nozzle portion controlling flow of the first portion of the exhaust gas flow and a second nozzle portion separately controlling flow of the second portion of the exhaust gas flow.

In a further embodiment of any of the foregoing aircraft propulsion systems, the controller is further programmed to maximize water recovered in the condenser by varying the ratio between the first portion of the exhaust gas flow and the second portion of the exhaust gas flow through the condenser.

In a further embodiment of any of the foregoing aircraft propulsion systems, the controller is further programmed to adjust the ratio between the first portion of the exhaust gas flow and the second portion of the exhaust gas flow continually based on information indicative of engine operation and of the information indicative of a current capacity of the cryogenic fuel to cool the exhaust gas flow.

In a further embodiment of any of the foregoing aircraft propulsion systems, the controller is further programmed to adjust the ratio between the first portion of the exhaust gas flow and the second portion of the exhaust gas flow to match a cooling capacity of the cryogenic fuel to maximize water recovery from the second portion of the exhaust gas flow.

In a further embodiment of any of the foregoing aircraft propulsion systems, a recuperating heat exchanger includes a first portion of the working fluid flow exhausted from the bottoming turbine is in thermal communication with a second portion of the working fluid flow exhausted from the bottoming compressor for heating the second portion of the working fluid flow before expansion through the bottoming turbine.

In a further embodiment of any of the foregoing aircraft propulsion systems, the water recovery system further comprises a water tank system, and a water separator where water is separated from the exhaust gas flow and communicated to the water tank system and the steam generation system.

In a further embodiment of any of the foregoing aircraft propulsion systems, the first portion of the exhaust gas flow is bypassed around the first heat exchanger and the second portion of the exhaust gas flow is communicated through the first heat exchanger.

In a further embodiment of any of the foregoing aircraft propulsion systems, wherein both the first portion of the exhaust gas flow and the second portion of the exhaust gas flow are passed through the evaporator to heat water and generate steam.

A gas turbine engine assembly according to another exemplary embodiment of this disclosure includes, among other possible things, a core engine comprising a compressor, combustor, and turbine, wherein a cryogenic fuel is mixed with compressed air and ignited in the combustor to generate an exhaust gas flow that is expanded through the turbine to generate shaft power, wherein the exhaust gas flow is split into a first portion and a second portion, a bottoming cycle where a working fluid is circulated within a closed circuit comprising a bottoming compressor section and a bottoming turbine section, wherein the working fluid is compressed in the bottoming compressor section and expanded through the bottoming turbine section to generate shaft power, a first heat exchanger where a portion of thermal energy from the exhaust gas flow is communicated to the working fluid of the bottoming cycle, a fuel system comprising a cryogenic fuel storage tank and a fuel flow path for routing a flow of cryogenic fuel to the combustor, a fuel/working fluid heat exchanger where a portion of thermal energy from the working fluid is communicated to the cryogenic fuel to cool the working fluid exhausted from the bottoming turbine and before the bottoming compressor, a water recovery system comprising a condenser where the exhaust gas flow is cooled to condense water, wherein the first portion of the exhaust gas flow is bypassed around the condenser and the second portion of the exhaust gas flow is communicated through the condenser, a steam generation system comprising an evaporator where water is heated to generate a steam flow, and a variable exhaust nozzle assembly comprising a first nozzle portion controlling flow of the first portion of the exhaust gas flow and a second nozzle portion separately controlling flow of the second portion of the exhaust gas flow.

A further embodiment of the foregoing gas turbine engine assembly includes a controller programmed to operate the variable exhaust nozzle assembly to control a ratio between the first portion of the exhaust gas flow and the second portion of the exhaust gas flow through the condenser based on information indicative of a current capacity of the cryogenic fuel to cool the exhaust gas flow in the condenser.

In a further embodiment of any of the foregoing gas turbine engine assemblies, the controller is further programmed to maximize water recovered in the condenser by varying the ratio between the first portion of the exhaust gas flow and the second portion of the exhaust gas flow.

In a further embodiment of any of the foregoing gas turbine engine assemblies, the controller is further programmed to adjust the ratio between the first portion of the exhaust gas flow and the second portion of the exhaust gas flow continually based on information indicative of engine operation and of the information indicative of a current capacity of the cryogenic fuel to cool the exhaust gas flow.

In a further embodiment of any of the foregoing gas turbine engine assemblies, the controller is further programmed to adjust the ratio between the first portion of the exhaust gas flow and the second portion of the exhaust gas flow to match a cooling capacity of the cryogenic fuel to maximize water recovery from the second portion of the exhaust gas flow.

In a further embodiment of any of the foregoing gas turbine engine assemblies, the first portion of the exhaust gas flow is bypassed around the first heat exchanger and the second portion of the exhaust gas flow is communicated through the first heat exchanger.

A method of operating an aircraft propulsion system according to another exemplary embodiment of this disclosure includes, among other possible things, generating an exhaust gas flow with a core engine for expansion through a turbine to generate shaft power, splitting the exhaust gas flow into a first portion and a second portion, recovering water from a second portion of the exhaust gas flow in a water recovery system comprising a condenser where the second portion of the exhaust gas flow is cooled to condense water, cooling the second portion of the exhaust gas flow with a flow of cryogenic fuel, controlling a ratio between the first portion and the exhaust gas flow that passes through a first variable nozzle portion and the second portion of the exhaust gas flow that passes through a second variable nozzle portion, and maximizing water recovered by the condenser by tailoring the ratio between the first portion of the exhaust gas flow that passes through the first variable nozzle portion and the second portion of the exhaust gas flow through the second variable nozzle portion to match a cooling capacity of the cryogenic fuel.

A further embodiment of the foregoing method further includes heating a working fluid of a bottoming cycle with one of the first portion and the second portion of the exhaust gas flow and expanding the heated working fluid through a bottoming turbine to generate shaft power.

A further embodiment of any of the foregoing methods further includes cooling the working fluid with a cryogenic fuel flow before cooling the second portion of the exhaust gas flow in the condenser.

A further embodiment of any of the foregoing methods further includes heating a portion of water recovered from the second portion of the exhaust gas flow with at least one of the first portion and the second portion of the exhaust gas flow to generate a steam flow for injection into the core engine.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

U.S. application Ser. No. 17/871,270 is incorporated herein, by reference in its entirety.

Figure 1:
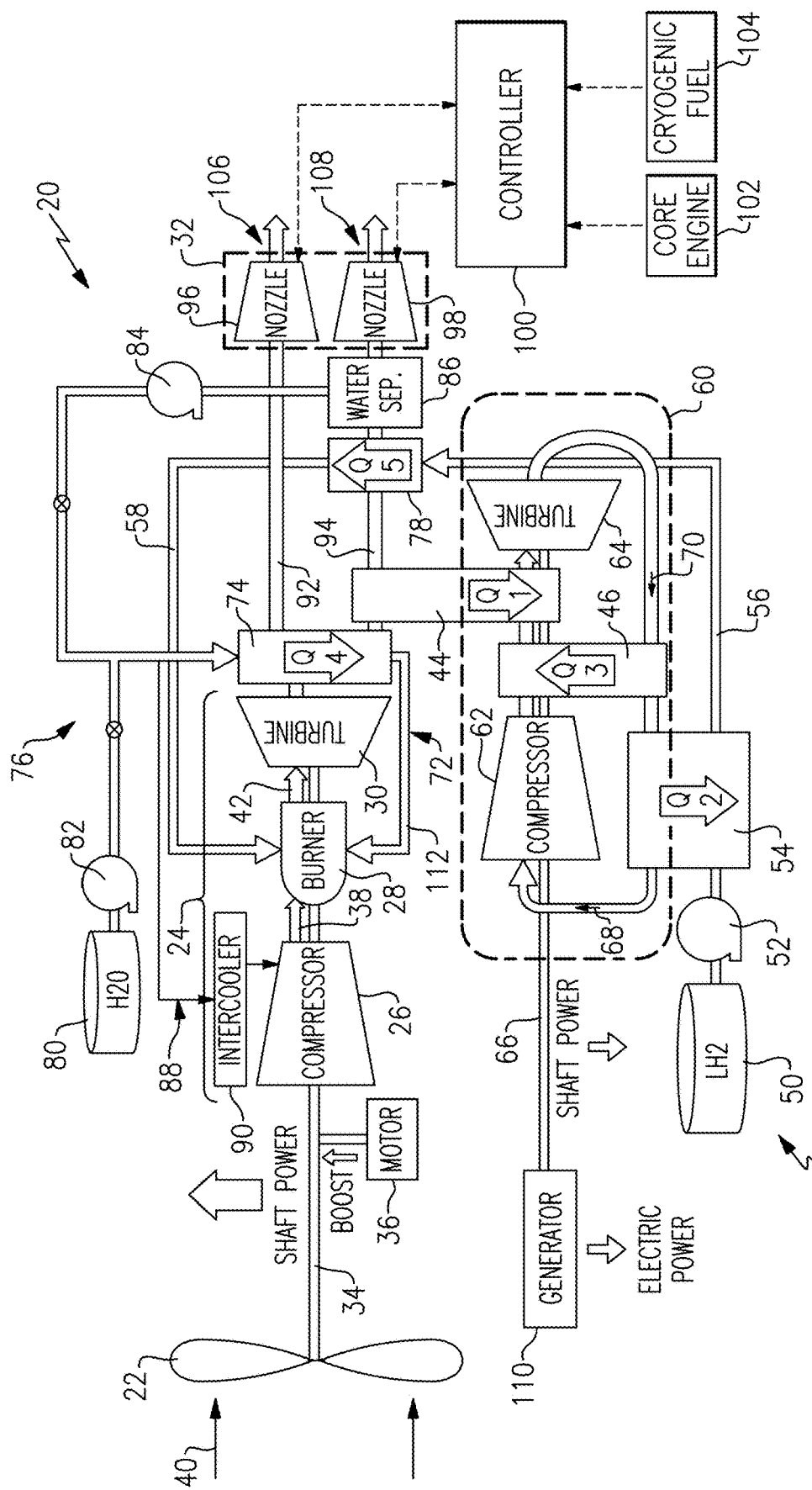
FIG. 1 is a schematic view of an example aircraft propulsion system including an exhaust gas flow that is split between a bottoming cycle and a steam generation system.

FIG. 1 schematically illustrates an aircraft propulsion system 20 that includes a bottoming cycle 60 with a working fluid heated by one portion an exhaust gas flow 42 split between the bottoming cycle 60, a water recovery system 76 and a steam generation system 72.

The example propulsion system 20 includes a core engine 24 including a compressor section 26, a combustor section 28 and the turbine section 30 disposed along the longitudinal axis A. The fan 22 drives an inlet airflow 40 into the compressor section 26. The inlet flow 40 is compressed and communicated as pressurized core flow 38 to the combustor 28 where the pressurized core flow 38 is mixed with a fuel flow 58 and ignited to generate the exhaust gas flow 42. The exhaust gas flow 42 expands through the turbine section 30 where energy is extracted and utilized to generate shaft power to drive an engine shaft 34. The engine shaft 34 drives the compressor section 26 and the fan 22. The exhaust gas flow 42 is subsequently exhausted through a nozzle 32.

A cryogenic fuel system 48 includes at least a fuel tank 50 and a fuel pump 52 to provide a liquid fuel flow 56 through a fuel passage to the combustor 28. The example fuel system 48 is configured to provide a hydrogen based fuel such as a liquid hydrogen ($LH_2$). Although hydrogen is disclosed by way of example, other cryogenic, non-carbon based fuels could be utilized and are within the contemplation of this disclosure.

A condenser 78 is disposed downstream of a fuel/working fluid heat exchanger 44 and uses the cryogenic fuel to cool the exhaust gas flow. The cryogenic fuel absorbs heat from the exhaust gas flow as it cools and provides further heating and transformation of the cryogenic fuel into a vaporized fuel flow 58. The vaporized fuel flow 58 is injected into the combustor 28 to generate the exhaust gas flow 42.

The fuel tank 50 includes features for storing a cryogenic fuel at temperatures required to maintain the fuel in a liquid phase. Temperatures required to maintain the cryogenic fuel in a liquid phase may be as low as about −412° F. In one example embodiment, the cryogenic fuel is maintained at a temperature below 0° F. In another example embodiment, the fuel is maintained in the tank 50 at temperatures below −100° F. The cryogenic fuel may be maintained at temperatures below about −150° F. and as low as about −435° F.

The low temperatures of the cryogenic fuel 56 provide a source of heat absorption that is utilized in the bottoming cycle 60. The bottoming cycle 60 provides for recovering thermal energy otherwise lost as exhaust through a nozzle assembly 32.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

The example bottoming cycle 60 includes a bottoming compressor 62 that provides a compressed working fluid flow to a bottoming turbine 64. The compressed working fluid flow is heated by heat from the core engine 24 communicated through the primary heat exchanger 44 into the working fluid. The heated working fluid flow is expanded through the turbine 64 to generate shaft power to drive an output shaft 66. The bottoming output shaft 66 may be utilized to drive an accessory component such as a generator 110. Working fluid flow exhausted from the bottoming turbine 64 is cooled in a fuel/working fluid heat exchanger 54 that utilizes the cryogenic fuel flow 56 as a heat sink. The cooled working fluid flow 68 is communicated back to the bottoming compressor 62 to repeat the cycle.

The generator 110 produces electric power that may be used by other engine and aircraft systems. In one example embodiment, the electric motor 36 coupled to the engine shaft 34 may be operated to input power to the engine shaft 34 to supplement power provided by the turbine 30. Although an example use of power from the bottoming cycle 60 is disclosed, other uses of the power recovered by operation of the bottoming turbine 64 are within the contemplation and scope of this disclosure.

A recuperative heat exchanger 46 provides for the transfer of thermal energy from a relatively hot working fluid 70 exhausted from the bottoming turbine 64 into a cooler portion of the working fluid flow exhausted from the bottoming compressor 62. In this manner, heat that would normally be lost is utilized to heat the working fluid flow prior to introduction into the bottoming turbine 64. Moreover, the working fluid 70 from the bottoming turbine 64 is initially cooled.

The propulsion system further includes a water recovery system 76 that includes the condenser 78 that cools the exhaust gas flow to condense water into a liquid. Condensed water is removed from the exhaust gas flow in a water separator 86 and communicated to a water storage tank 80. A portion of recovered water may be communicated directly to a steam generation system 72. Another portion of recovered water many be communicated as an intercooling water flow 88 to an intercooler 90. The water recovery system 76 may include a first pump 82 for pressurizing water from the storage tank 80. A second pump 84 may be included for pressurizing water from the water separator 86. Valves and other fluid control devices and conduits may be provided to regulate water flow from the water separator 86.

The steam generation system 72 includes an evaporator 74 that uses heat from the exhaust gas flow to vaporize the water and generate a steam flow 112 that may be injected into the combustor 28. Injection of steam into the combustor 28 provides for increased efficiency in operation of the core engine 24. The increased efficiency is a result of an increase in mass flow provided by the steam flow 112 through the turbine section 30 without a corresponding increase in work required by the compressor 26.

The exhaust gas flow 42 exhausted from the turbine 30 is split into a first portion 92 and a second portion 94. The first portion 92 of the exhaust gas flow 42 is communicated through the evaporator 74 and bypasses around the condenser 78 to a first nozzle portion 96. The second portion 94 of the exhaust gas flow 42 passes through the evaporator 74, the primary heat exchanger 44, the condenser 78, the water separator 86 and a second nozzle portion 98. The evaporator 74 and primary heat exchanger 44 reject an initial portion of heat energy such that the second portion 94 of the exhaust gas flow 42 is initially cooled before being communication through the condenser 78. In the condenser 78, the second portion 94 of the exhaust gas flow 42 is cooled further to condense water that is separated in the water separator 86 and eventually exhausted through the second nozzle portion 98.

Separation of the exhaust gas flow 42 into the first portion 92 and the second portion 94 provides for control over the recovery of water based on the capability of the cryogenic fuel 56 to cool. The amount of cooling required to condenser water from the entire exhaust gas flow 42 may be significant. Accordingly, splitting the exhaust gas flow 42 into the first and second portions 92, 94 reduces the heat load and enables adjustment of water recovery based on operating conditions. Moreover, the amount of exhaust gas flow may be controlled by adjusting flow through the nozzle assembly 32.

In one example embodiment, the nozzle assembly 32 is a variable area nozzle that includes the first nozzle portion 96 and the second nozzle portion 98. Each of the first nozzle portion 96 and the second nozzle portion 98 are variable to adjust and vary corresponding first and second output flows 106, 108. The first nozzle portion 96 and the second nozzle portion 98 are independently variable to change and control a ratio between the first and second output flows 106, 108. Variation of the ratio of the output flows 106, 108 controls the relative amount of flows between the first portion 92 and the second portion 94 of the exhaust gas flow 42. Opening the first nozzle portion 96 to increase the first output flow 106 relative to the second output flow 108 reduces the amount of the second portion 94 of the exhaust gas flow 42 that is communicated through the condenser 78. A decrease in the first output flow 106 by closing the first nozzle portion 96 and opening the second nozzle portion 98 provides an increase in the second portion of the exhaust gas flow 94 communicated through the condenser 78.

Accordingly, by varying and controlling a ratio between the output flows 106, 108, the amount of exhaust gas flow routed through the condenser 78 is controlled. Controlling the amount of exhaust gas flow through the condenser 78 controls the amount of water available for extraction to further provide for adjustment based on the available cooling capacity of the fuel flow 56. The capacity of the fuel flow 56 to cool the first portion 94 of the exhaust gas flow 42 may vary during engine operation. Variations in the capacity for cooling may occur due to fuel demand by the core engine, ambient conditions, heat input from the bottoming cycle 60, and any other variable engine operating parameters.

A controller 100 is provided to control operation of the first and second nozzle portions 96, 98 to vary and control a ratio of the output flows 106, 108 and thereby the amount of exhaust gas flow that is communicated through the condenser 78. The controller 100 is programmed to adjust each of the first nozzle portion 96 and the second nozzle portion 98 to adjust the amount of the second portion 94 communicated through the condenser 78. The controller 100 is programmed to operate the nozzle portions 96, 98 based, at least on information indicative of core engine operation 102 and conditions of the cryogenic fuel 104.

In one example operational embodiment, the controller 100 adjusts the first nozzle portion 96 and the second nozzle portion 98 to increase the amount of the first output flow 106 relative to the second output flow 108 to generate a decrease in the second portion 94 of the exhaust gas flow 42 communicated through the condenser 78. The decrease in the second portion 94 of the exhaust gas flow 42 decreases the amount of water available for recovery and also decreases the amount of cooling required by the fuel flow 56.

The controller 100 may also adjust the nozzle portions 96, 98 to increase the output flow 108 relative to the output flow 106 to increase the quantity of the second portion of the exhaust gas flow 94 through the condenser 78. The increased exhaust gas flow through the condenser 78 may be provided to increase water recovery within the cooling capacity of the fuel flow 56. The ratio between the output flows 106, 108 may be constantly varied to tailor water recovery to current engine operation. The ratio between the output flows may be varied based on a predetermined schedule corresponding to engine and aircraft operation.

Accordingly, the controlled variable area nozzle portions 96, 98 provide for tailoring of water recovery by the adjusting the amount of exhaust flow through the condenser 78. Tailoring of the ratio between the first and second exhaust gas flows 106, 108 provides for maximizing the amount of water condensed and recovered from the exhaust gas flow 42 in view of current engine operating conditions and the cooling capacity of the fuel flow 56.

The example controller 100 may be specially constructed for operation of the nozzle assembly 32, or it may comprise at least a general-purpose computer selectively activated or reconfigured by software instructions stored in a memory device. The controller 100 may further be part of full authority digital engine control (FADEC) or an electronic engine controller (EEC).

In the primary heat exchanger 44, thermal energy is input in to the working flow of the bottoming cycle 60. In one example embodiment, the working fluid is heated by the second portion 94 of the exhaust gas flow 42 through the primary heat exchanger 44 and the heat is recovered in the form of shaft power (via shaft 66) driven by the bottoming turbine 64. The cryogenic fuel flow 56 cools the working fluid to very low temperatures that enable a significant amount thermal energy to be recovered from the core engine 24. Although thermal energy from the exhaust gas flow is shown and described by way of example, thermal energy from other heat generating devices may be recovered in the example bottoming cycle 60.

The second portion 94 of the exhaust gas flow 42 is initially cooled by rejecting heat through each of the evaporator 74 and the primary heat exchanger 44 before entering the condenser 78. In the condenser 78, the cryogenic fuel 56 is used to further cool the exhaust gas flow and condense water into a liquid form that can be removed in the water separator 86. When the amount of cooling required to condense water in the condenser exceeds the capability of the cryogenic fuel 56, the controller 100 adjusts the first and second nozzle portions 96, 98 to tailor the amount of the second portion 94 of the exhaust gas flow 42 that is routed through the condenser 78 to match capability of the cryogenic fuel to absorb thermal energy.

Figure 2:
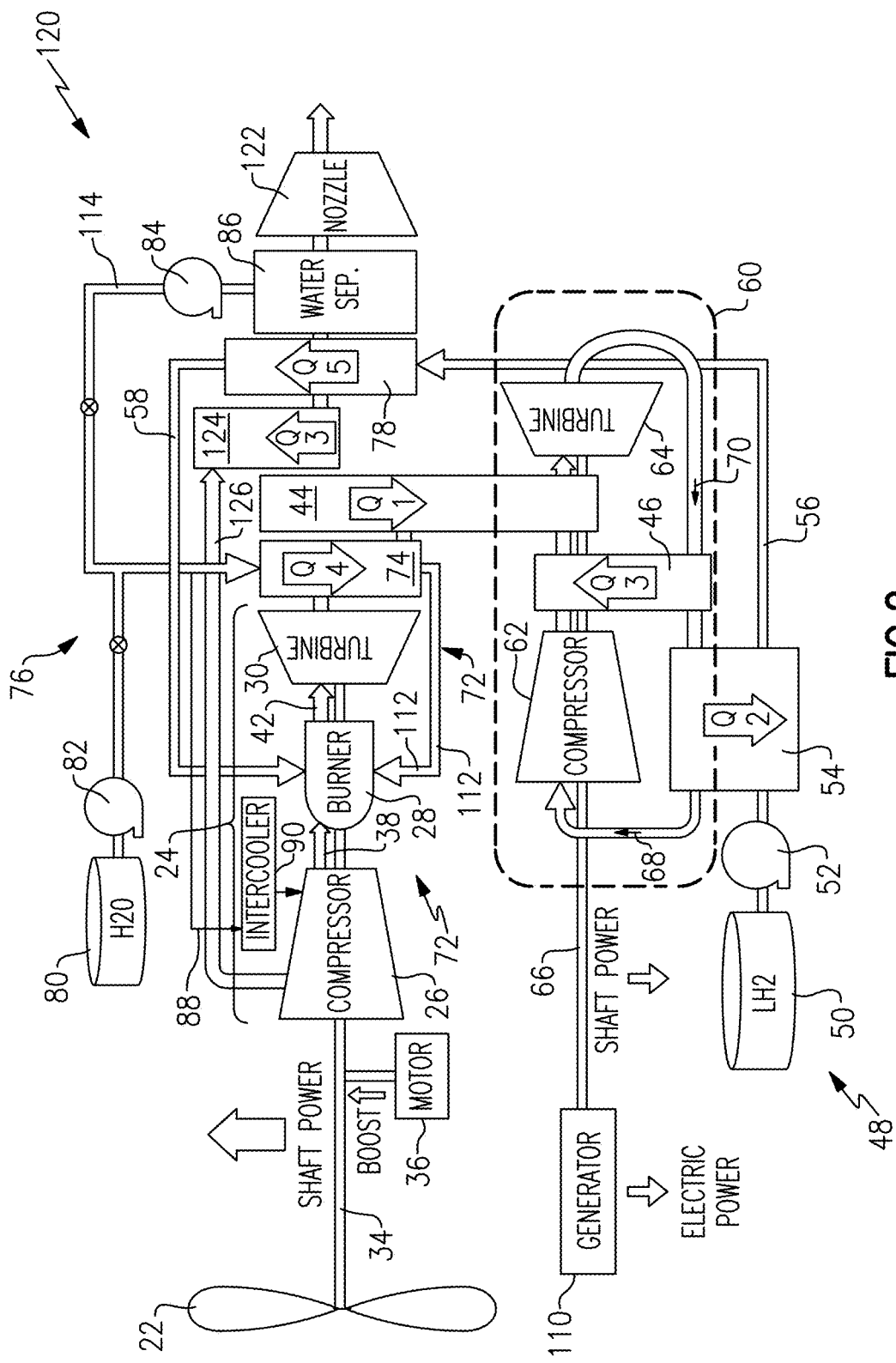
FIG. 2 is a schematic view of another example aircraft propulsion system including a bottoming cycle and a water recovery system that both use a cryogenic fuel flow as a heat sink.

Referring to FIG. 2, another example propulsion system is schematically shown and indicated at 120. The propulsion system 120 includes the bottoming cycle 60 that includes features and operates in substantially the same manner as explained above with regard to the propulsion system 20. Moreover, the water recover system 76 and steam generation system 72 includes the same features and operation as previously explained with regard to the propulsion system 20 except for the adjustable nozzle assembly.

The propulsion system 120 includes a nozzle 122 for all of the exhaust gas flow 42. A bypass cooling flow 126 is used to further cool the exhaust gas flow within a bypass heat exchanger 124. In this example embodiment, the bypass flow 126 is a cooling flow tapped from a location within the compressor 26. The additional cooling provided by the bypass cooling flow 126 reduces the cooling load required by the condenser 78. Accordingly, the bypass heat exchanger 124 can reduce the required heat absorption required to be performed by the cryogenic fuel 56. The reduced requirements aid water generation when the engine is operating outside a desired parameter for the production of water and steam.

Although steam injection and intercooling are disclosed by way of example as uses for water recovered from the exhaust gas flow, other uses for recovered water may be utilized and are within the contemplation and scope of this disclosure.

Accordingly, the example propulsion systems include bottoming cycles that leverage the cold sink available by the cryogenic fuels and tailors operation to optimize water recovery and bottoming cycle efficiency.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. An aircraft propulsion system comprising:
a core engine comprising a combustor where a cryogenic fuel is mixed with compressed air and ignited to generate an exhaust gas flow, wherein the exhaust gas flow is split into a first portion and a second portion;
a propulsive fan driven by the core engine;
a bottoming cycle where a working fluid is circulated within a closed circuit comprising a bottoming compressor and a bottoming turbine, wherein the working fluid is compressed in the bottoming compressor and expanded through the bottoming turbine to generate shaft power;
a first heat exchanger where a portion of thermal energy from the exhaust gas flow is communicated to the working fluid of the bottoming cycle;
a fuel system comprising a cryogenic fuel storage tank and a fuel flow path for routing the cryogenic fuel to the combustor;
a fuel/working fluid heat exchanger where a portion of thermal energy from the working fluid is communicated to the cryogenic fuel to cool the working fluid exhausted from the bottoming turbine and before the bottoming compressor;
a water recovery system comprising a condenser where the second portion of the exhaust gas flow is cooled to condense water, wherein the first portion of the exhaust gas flow is bypassed around the condenser;
a steam generation system comprising an evaporator where water is heated to generate a steam flow, wherein a portion of the cryogenic fuel cools the exhaust gas flow within the condenser; and
a variable exhaust nozzle assembly, wherein the variable exhaust nozzle assembly is adjustable to separately control the first portion of the exhaust gas flow and the second portion of the exhaust gas flow communicated through the condenser.

2. The aircraft propulsion system as recited in claim 1, further comprising a controller programmed to operate the variable exhaust nozzle assembly to control a ratio between the first portion of the exhaust gas flow and the second portion of the exhaust gas flow through the condenser based on information indicative of a current capacity of the cryogenic fuel to cool the exhaust gas flow in the condenser.

3. The aircraft propulsion system as recited in claim 2, wherein the variable exhaust nozzle assembly includes a first nozzle portion controlling flow of the first portion of the exhaust gas flow and a second nozzle portion separately controlling flow of the second portion of the exhaust gas flow.

4. The aircraft propulsion system as recited in claim 3, wherein the controller is further programmed to maximize water recovered in the condenser by varying the ratio between the first portion of the exhaust gas flow and the second portion of the exhaust gas flow through the condenser.

5. The aircraft propulsion system as recited in claim 2, wherein the controller is further programmed to adjust the ratio between the first portion of the exhaust gas flow and the second portion of the exhaust gas flow continually based on information indicative of engine operation and of the information indicative of the current capacity of the cryogenic fuel to cool the exhaust gas flow in the condenser.

6. The aircraft propulsion system as recited in claim 2, wherein the controller is further programmed to adjust the ratio between the first portion of the exhaust gas flow and the second portion of the exhaust gas flow to match a cooling capacity of the cryogenic fuel to maximize water recovery from the second portion of the exhaust gas flow.

7. The aircraft propulsion system as recited in claim 1, further comprising a recuperating heat exchanger where a first portion of a flow of the working fluid exhausted from the bottoming turbine is in thermal communication with a second portion of the flow of the working fluid exhausted from the bottoming compressor for heating the second portion of the flow of the working fluid before expansion through the bottoming turbine.

8. The aircraft propulsion system as recited in claim 1, wherein the water recovery system further comprises a water tank system, and a water separator where water is separated from the exhaust gas flow and communicated to the water tank system and the steam generation system.

9. The aircraft propulsion system as recited in claim 1, wherein the first portion of the exhaust gas flow is bypassed around the first heat exchanger and the second portion of the exhaust gas flow is communicated through the first heat exchanger.

10. The aircraft propulsion system as recited in claim 1, wherein both the first portion of the exhaust gas flow and the second portion of the exhaust gas flow are passed through the evaporator to heat water and generate steam.

11. A gas turbine engine assembly comprising:
a core engine comprising a compressor, a combustor, and a turbine, wherein a cryogenic fuel is mixed with compressed air and ignited in the combustor to generate an exhaust gas flow that is expanded through the turbine to generate shaft power, wherein the exhaust gas flow is split into a first portion and a second portion;
a bottoming cycle where a working fluid is circulated within a closed circuit comprising a bottoming compressor and a bottoming turbine, wherein the working fluid is compressed in the bottoming compressor and expanded through the bottoming turbine to generate shaft power;
a first heat exchanger where a portion of thermal energy from the exhaust gas flow is communicated to the working fluid of the bottoming cycle;
a fuel system comprising a cryogenic fuel storage tank and a fuel flow path for routing a flow of the cryogenic fuel to the combustor;
a fuel/working fluid heat exchanger where a portion of thermal energy from the working fluid is communicated to the cryogenic fuel to cool the working fluid exhausted from the bottoming turbine and before the bottoming compressor;
a water recovery system comprising a condenser where the exhaust gas flow is cooled to condense water, wherein the first portion of the exhaust gas flow is bypassed around the condenser and the second portion of the exhaust gas flow is communicated through the condenser;
a steam generation system comprising an evaporator where water is heated to generate a steam flow; and
a variable exhaust nozzle assembly comprising a first nozzle portion controlling flow of the first portion of the exhaust gas flow and a second nozzle portion separately controlling flow of the second portion of the exhaust gas flow.

12. The gas turbine engine assembly as recited in claim 11, further comprising a controller programmed to operate the variable exhaust nozzle assembly to control a ratio between the first portion of the exhaust gas flow and the second portion of the exhaust gas flow through the condenser based on information indicative of a current capacity of the cryogenic fuel to cool the exhaust gas flow in the condenser.

13. The gas turbine engine assembly as recited in claim 12, wherein the controller is further programmed to maximize water recovered in the condenser by varying the ratio between the first portion of the exhaust gas flow and the second portion of the exhaust gas flow.

14. The gas turbine engine assembly as recited in claim 12, wherein the controller is further programmed to adjust the ratio between the first portion of the exhaust gas flow and the second portion of the exhaust gas flow continually based on information indicative of engine operation and of the information indicative of the current capacity of the cryogenic fuel to cool the exhaust gas flow in the condenser.

15. The gas turbine engine assembly as recited in claim 12, wherein the controller is further programmed to adjust the ratio between the first portion of the exhaust gas flow and the second portion of the exhaust gas flow to match a cooling capacity of the cryogenic fuel to maximize water recovery from the second portion of the exhaust gas flow.

16. The gas turbine engine assembly as recited in claim 11, wherein the first portion of the exhaust gas flow is bypassed around the first heat exchanger and the second portion of the exhaust gas flow is communicated through the first heat exchanger.

17. A method of operating an aircraft propulsion system comprising:
 generating an exhaust gas flow with a core engine for expansion through a turbine to generate shaft power;
 splitting the exhaust gas flow into a first portion and a second portion;
 recovering water from a second portion of the exhaust gas flow in a water recovery system comprising a condenser where the second portion of the exhaust gas flow is cooled to condense water;
 cooling the second portion of the exhaust gas flow with a flow of a cryogenic fuel;
 bypassing the first portion of the exhaust gas flow around the condenser;
 controlling a ratio between the first portion and the exhaust gas flow that passes through a first variable nozzle portion and the second portion of the exhaust gas flow that passes through a second variable nozzle portion; and
 maximizing water recovered by the condenser by tailoring the ratio between the first portion of the exhaust gas flow that passes through the first variable nozzle portion and the second portion of the exhaust gas flow through the second variable nozzle portion to match a cooling capacity of the cryogenic fuel.

18. The method as recited in claim 17, further comprising heating a working fluid of a bottoming cycle with one of the first portion and the second portion of the exhaust gas flow and expanding the heated working fluid through a bottoming turbine to generate shaft power.

19. The method as recited in claim 18, further comprising cooling the working fluid with the flow of the cryogenic fuel before cooling the second portion of the exhaust gas flow in the condenser.

20. The method as recited in claim 17, further comprising heating a portion of water recovered from the second portion of the exhaust gas flow with at least one of the first portion and the second portion of the exhaust gas flow to generate a steam flow for injection into the core engine.

* * * * *